United States Patent Office 2,907,761
Patented Oct. 6, 1959

2,907,761
VITAMIN A ALDEHYDE DERIVATIVE

Charles H. Benton, Jr., Penfield, N.Y., assignor to Eastman Kodak Company, Rochester, N.Y., a corporation of New Jersey No Drawing. Application September 19, 1958
Serial No. 761,966

4 Claims. (Cl. 260—240)

This invention relates to a new derivative of vitamin A aldehyde, and more particularly, to a new vitamin A aldehyde nitrogen-containing derivative having high biological availability and improved oxidative stabilty.

Various amine or nitrogen-containing derivatives having the vitamin A moiety have been described in the literature. However, such derivatives have been characterized as having relatively low vitamin A activity. Weisler, U.S. 2,583,194, disclosed a process for preparing vitamin A amine, this compound having less than about 50% vitamin A activity. Another amine compound having the vitamin A moiety was described in Schaaf et al. U.S. 2,819,308, this compound was characterized as having a vitamin A activity of only about 50%. Similarly, there are numerous other amines or nitrogen-containing compounds having the vitamin A moiety that have even less vitamin A activity. Typical of such low potency compounds are the reaction products of vitamin A aldehyde with such amines as hydrazine, hydroxyl amine, diphenylhydrazine, semicarbazide, thiosemicarbazide, phenylhydrazine and related compounds.

The vitamin A moiety, because of its conjugated unsaturation, is extremely labile to oxidation. The vitamin A activity of such compounds as vitamin A aldehyde, vitamin A alcohol, vitamin A acetate, vitamin A palmitate and the like is readily reduced or destroyed by oxidation. Likewise, many nitrogen-containing vitamin A-active materials are labile to oxidation.

It is an object of this invention to provide a new vitamin A nitrogen-containing derivative.

It is another object of this invention to provide a novel vitamin A amine having particularly high biological availability.

It is likewise an object of this invention to provide a new vitamin A nitrogen-containing derivative having improved stability to oxidative deterioration.

It is still another object of this invention to provide a new crystalline nitrogen-containing derivative that can be readily prepared from vitamin A aldehyde.

These and other objects of the invention are attained as described in detail hereinafter.

The vitamin A-active nitrogen-containing compound of the invention can be prepared by reacting vitamin A aldehyde and N,N'-diphenylethylenediamine. The compound of the invention is 1,3-diphenyl-2-[2,6-dimethyl-8-(2,2,6-trimethyl-1-cyclohexyl)-1,3,5,7-octatrienyl] imidazolidine. Hereafter, this compound is referred to simply as "vitamin A aldehyde glyoxalidine." The compound of the invention has the following structural formula:

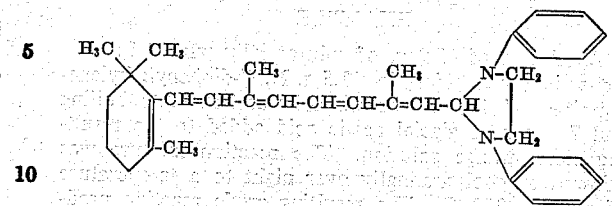

The vitamin A aldehyde employed in preparing the compound of the invention is a well known compound having the structural formula:

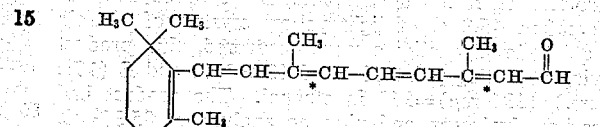

Vitamin A aldehyde can exist in the form of several geometrical isomers based on the cis or trans configuration around the olefinic double bonds in the 2 and 6 positions as starred in the structural formula immediately above. Geometrical isomers include 2,6-trans,-trans vitamin A aldehyde; 2,6-cis,cis vitamin A aldehyde; 2-trans,6-cis vitamin A aldehyde, and 2-cis,6-trans vitamin A aldehyde. The 2,6-trans,trans isomeric form, sometimes called "retinene," exhibits the highest biological activity and is preferably employed in preparing the vitamin A aldehyde glyoxalidine of the invention, not only because of its high biological activity, but also because of the desirable crystalline form its glyoxalidine derivative possesses. However, I contemplate that any of the above isomers of vitamin A aldehyde, or mixtures thereof in any proportion, can be used.

Vitamin A aldehyde reacts readily with N,N'-diphenylethylenediamine to form the present vitamin A aldehyde glyoxalidine derivative in relatively high yields. The reaction is preferably carried out in an organic solvent substantially inert to the reactants. Such aliphatic alcohols as methanol, ethanol, propanol, butanol and the like are particularly applicable although other suitable inert organic solvents such as the diethyl ether, isopropyl ether, glycerol and the like can also be employed. Likewise, vitamin A aldehyde and N,N'-diphenylethylenediamine can be reacted by merely melting these reactants together in the absence of a solvent. A small amount of a catalyst such as acetic acid can be added to the reaction mixture to facilitate the reaction although such a catalyst is not needed to effect the reaction. The reaction proceeds at room temperature although elevated temperatures up to the decomposition temperature of the reactants can be employed to facilitate the reaction. The resulting reaction product can be purified by well known separation or purification methods such as by crystallization or by chromatographic separation.

The vitamin A aldehyde glyoxalidine of the invention is particularly useful because it unexpectedly has a higher biological availability than other closely related nitrogen-containing compounds having the vitamin A moiety. In addition, the compound of the invention is unusually stable to oxidative deterioration, such a property being generally absent in vitamin A-active compounds. The vitamin A aldehyde glyoxalidine of the invention can be employed as the vitamin A-active material in a wide variety of liquid, powdered, flaked, pelleted and incapsulated vitamin compositions. Typical carriers for such vitamin A materials include gelatin, pectin, gum arabic, waxes, high melting fatty materials such as beef tallow and monostearin, sugar, vegetable oil and other well-known vitamin carriers. The stability to oxidative deterioration of vitamin A aldehyde gloxalidine makes this material particularly useful for fortifying animal feeds.

The invention is further illustrated by the following examples of preferred embodiments thereof.

EXAMPLE 1

A mixture of 15.0 g. of substantially pure 2,6-trans,-trans vitamin A aldehyde, 13.5 g. N,N'-diphenylethylenediamine and 170 ml. of ethanol was heated to boiling and 7 drops of glacial acetic acid added to the resulting clear orange solution. The reaction mixture was allowed to cool gradually over night to a temperature of about —20° C. The resulting crude reaction product was separated by filtration, and recrystallized twice from a solvent composed of 10% benzene and 90% petroleum ether having a boiling range of 60–100° C. Thereafter, 15.3 g. of light yellow crystals of vitamin A aldehyde glyoxalidine were recovered, this product having a melting point of 135.6–139.0° C. and E (1%, 1 cm.) (334 m$\mu$)=962 in ethanol. The product had a carbon, hydrogen and nitrogen analysis of 85.3% C, 8.8% H and 5.9% N; the theoretical content being 85.6% C, 8.5% H and 6.1% N.

EXAMPLE 2

The vitamin A aldehyde glyoxalidine prepared as described in Example 1 showed excellent stability to oxidative deterioration. A sample of this compound was placed in an open beaker exposed to air in an oven at 55° C. After 1145 hours the extinction coefficient of the exposed sample remained unchanged. Samples of vitamin A aldehyde and vitamin A acetate when exposed under these conditions for the same length of time was substantially completely decomposed.

EXAMPLE 3

The vitamin A aldehyde glyoxalidine of the invention was found to have high vitamin A biological availability. The product of Example 1, as well as several other derivatives of vitamin A aldehyde, were tested with respect to biological availability. The results of this test are summarized by the data set out in the table below.

Table

| Vitamin A aldehyde derivative: | Percent relative molar biopotency [1] |
|---|---|
| a. Vitamin A aldehyde glyoxalidine | 92 |
| b. Vitamin A aldehyde hydrazone | 27 |
| c. Vitamin A aldehyde oxime | 23 |
| d. Vitamin A aldehyde diphenylhydrazone | 6.7 |
| e. Vitamin A aldehyde semicarbazone | 3.7 |
| f. Vitamin A aldehyde thiosemicarbazone | 2.3 |
| g. Vitamin A aldehyde phenylhydrazone | 1.4 |

[1] Measured by liver storage test in rats against 2,6-trans,-trans-vitamin A aldehyde. (Vitamin A aldehyde=100%.)

The vitamin A aldehyde derivatives set out in the above table were prepared by reacting 2,6-trans,trans vitamin A aldehyde with various amines as indicated below. These derivatives have the following formulas wherein "(A)" is the vitamin A moiety

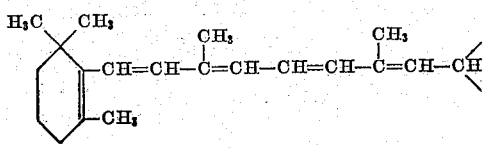

a. Vitamin A aldehyde glyoxalidine (prepared from N,N'diphenylethylenediamine)

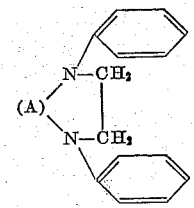

b. Vitamin A aldehyde hydrazone (prepared from hydrazine)

$$(A)=N-NH_2$$

c. Vitamin A aldehyde oxime (prepared from hydroxyl amine)

$$(A)=N-OH$$

d. Vitamin A aldehyde diphenylhydrazone (prepared from diphenylhydrazine)

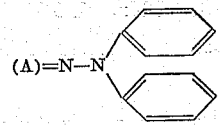

e. Vitamin A aldehyde semicarbazone (prepared from semicarbazide)

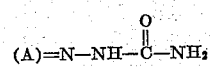

f. Vitamin A aldehyde thiosemicarbazone (prepared from thiosemicarbazide)

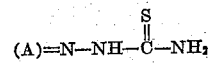

g. Vitamin A aldehyde phenylhydrazone (prepared from phenylhydrazine)

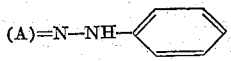

As can be observed from the data set out in the above table, the vitamin A aldehyde of the invention has unexpectedly high biological availability or activity as compared to other closely related compounds having the vitamin A moiety and one or more nitrogen atoms.

EXAMPLE 4

Vitamin A aldehyde glyoxalidine can also be readily prepared from a concentrate of cis and trans isomers of vitamin A aldehyde. A 16 g. portion of an isomeric mixture of vitamin A aldehyde containing about 38% by weight of 2,6-trans,trans vitamin A aldehyde and the remainder vitamin A aldehyde isomers having cis configurations, E (1%, 1 cm.) (370 m$\mu$)=961 in ethanol, was heated on a steam bath with 10.7 g. of N,N'-diphenylethylenediamine in about 150 ml. of ethanol for about 5 minutes, and then allowed to cool over night to —20° C. The ethanol solvent was thereafter decanted from the resulting crude reaction product, which crude reaction product was chromatographed on a sodium alumino-silicate ("Doucil") column to give 21.7 g. of vitamin A aldehyde glyoxalidine having a viscous or syrupy consistency, and having E (1%, 1 cm.) (341 m$\mu$)=599 in chloroform.

As described hereinabove, the invention is concerned with a novel derivative of vitamin A aldehyde, namely, the glyoxalidine derivative. This vitamin A aldehyde derivative has unusual properties in that it has particularly high vitamin A biological availability for a nitrogen-containing or amine compound, as well as having high resistance to oxidative deterioration. Further, the glyoxalidine of the invention can be prepared in relatively high yields from readily available reactants by a process which proceeds under simple reaction conditions.

While the invention has been described in detail with reference to certain preferred embodiments thereof, it will be understood that variations and modifications can be effected within the spirit and scope of the invention as disclosed hereinabove and as defined in the appended claims.

I claim:

1. A vitamin A-active compound having the structural formula:

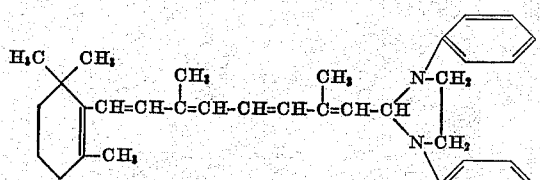

2. A process for preparing 1,3-diphenyl-2-[2,6-dimethyl - 8 - (2,2,6 - trimethyl - 1 - cyclohexenyl) - 1,3,5,7-octatrienyl] imidazolidine which comprises reacting vitamin A aldehyde with N,N'-diphenylethylene diamine.

3. The process according to claim 2 wherein the vitamin A aldehyde is 2,6-trans,trans vitamin A aldehyde.

4. The process according to claim 2 wherein the vitamin A aldehyde is a cis and trans isomeric mixture of vitamin A aldehyde.

No references cited.